Figure 5:
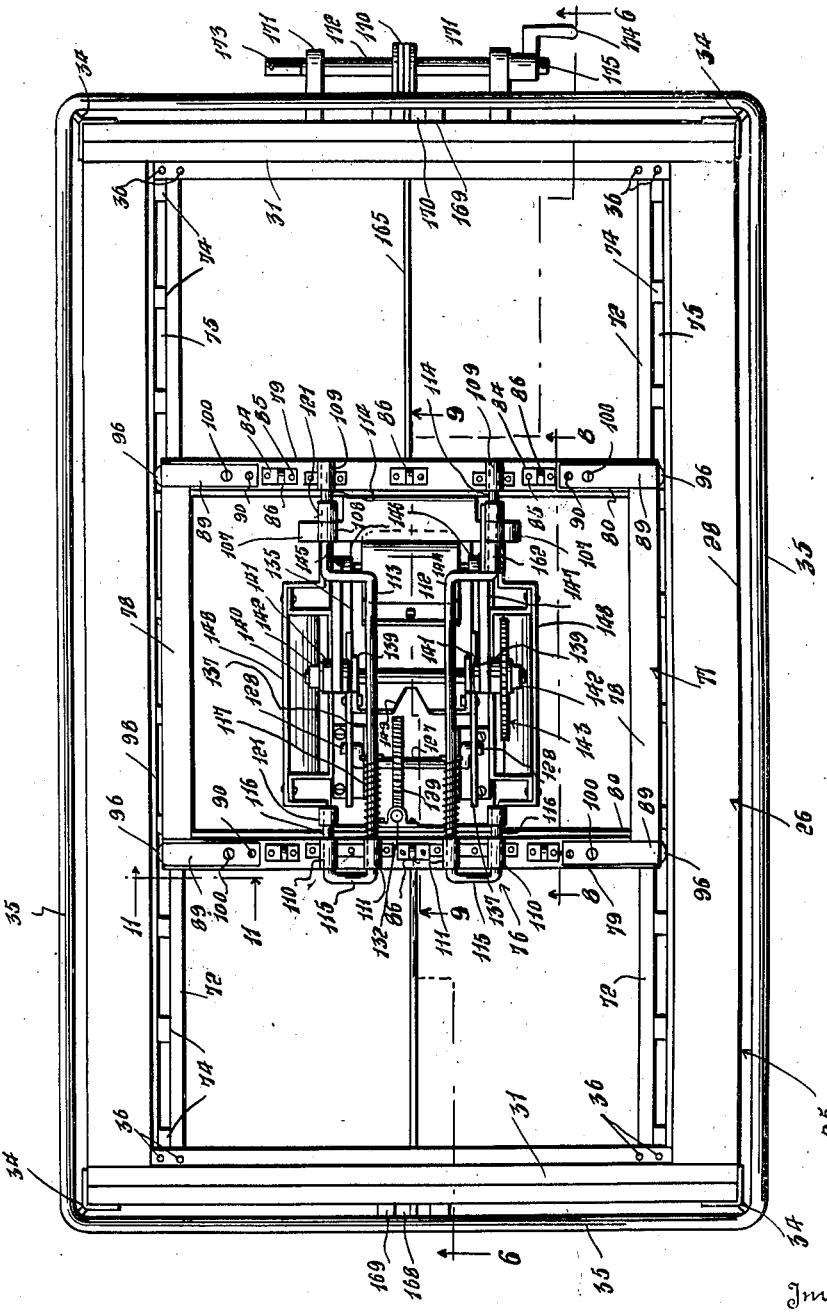

March 9, 1943.　　　　O. BRAY　　　　2,313,617
SAW BENCH
Filed June 26, 1941　　　　6 Sheets-Sheet 1
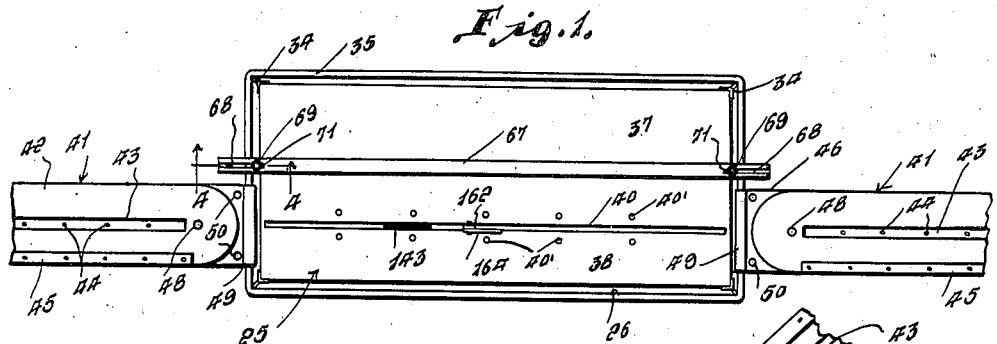
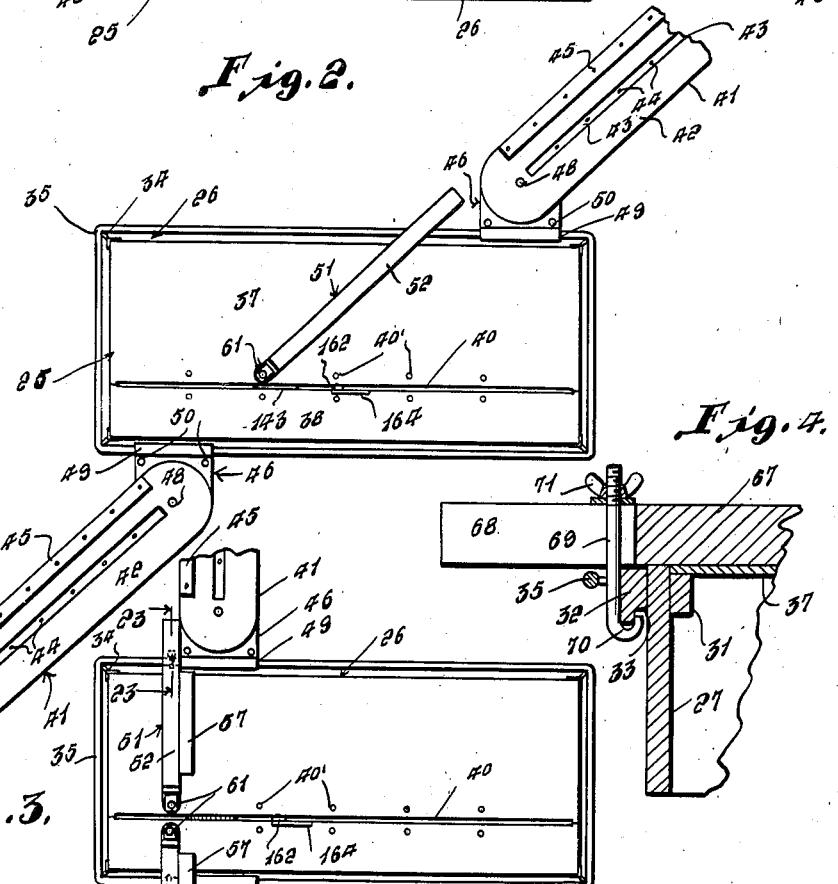
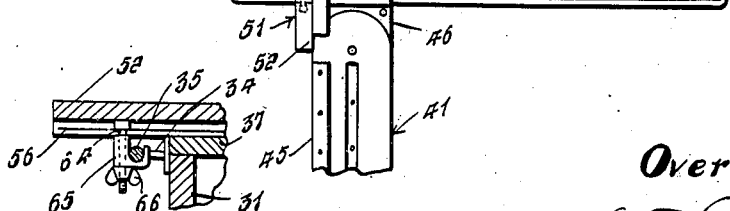
Inventor
Overton Bray
By L. F. Rudolph
Attorney March 9, 1943.　　　O. BRAY　　　2,313,617
SAW BENCH
Filed June 26, 1941　　　6 Sheets-Sheet 2

Inventor
Overton Bray
By L. F. Randolph
Attorney

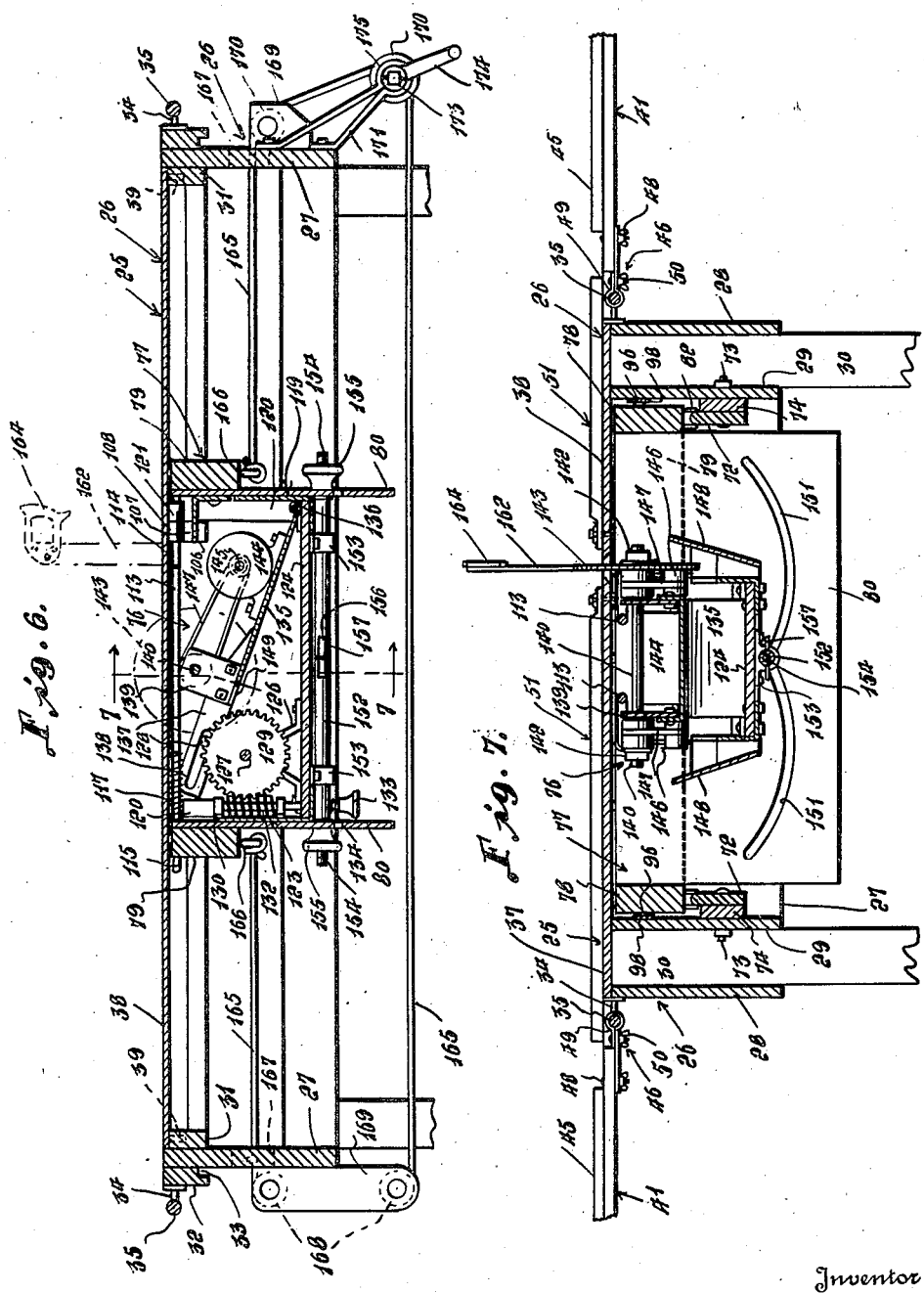

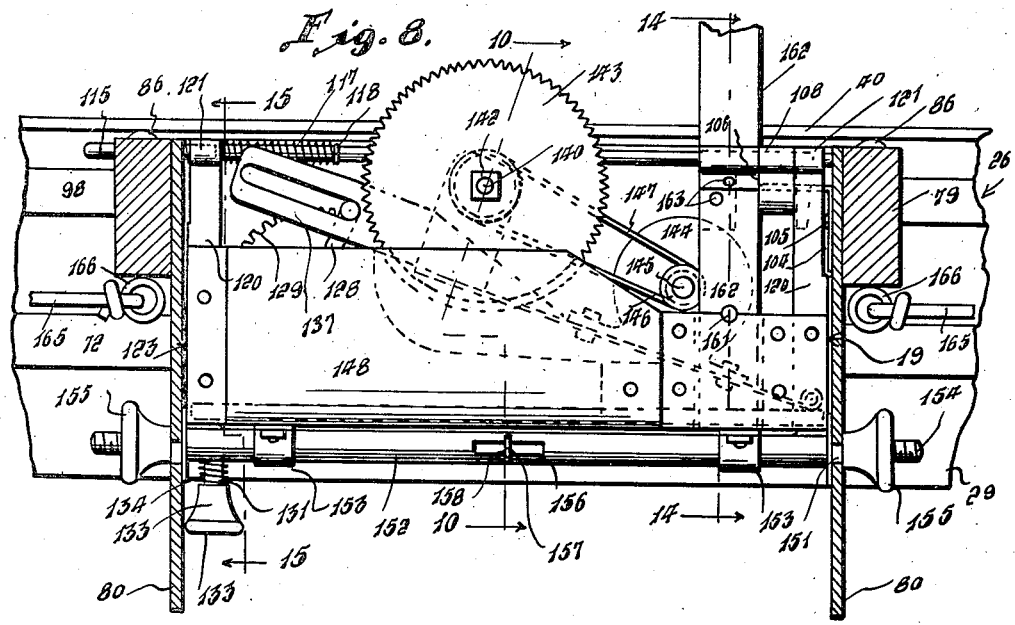
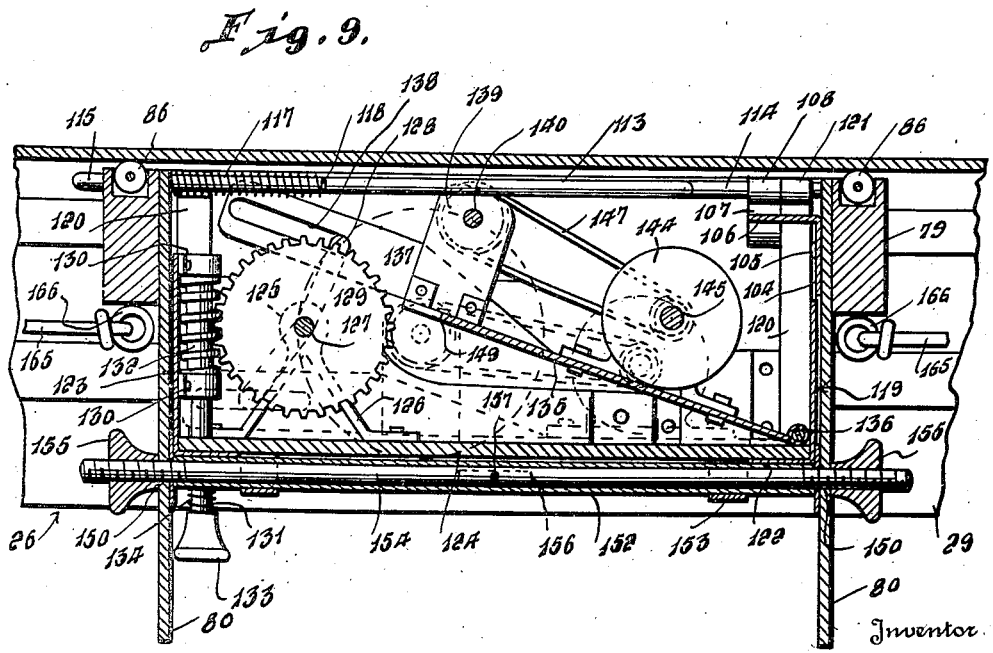

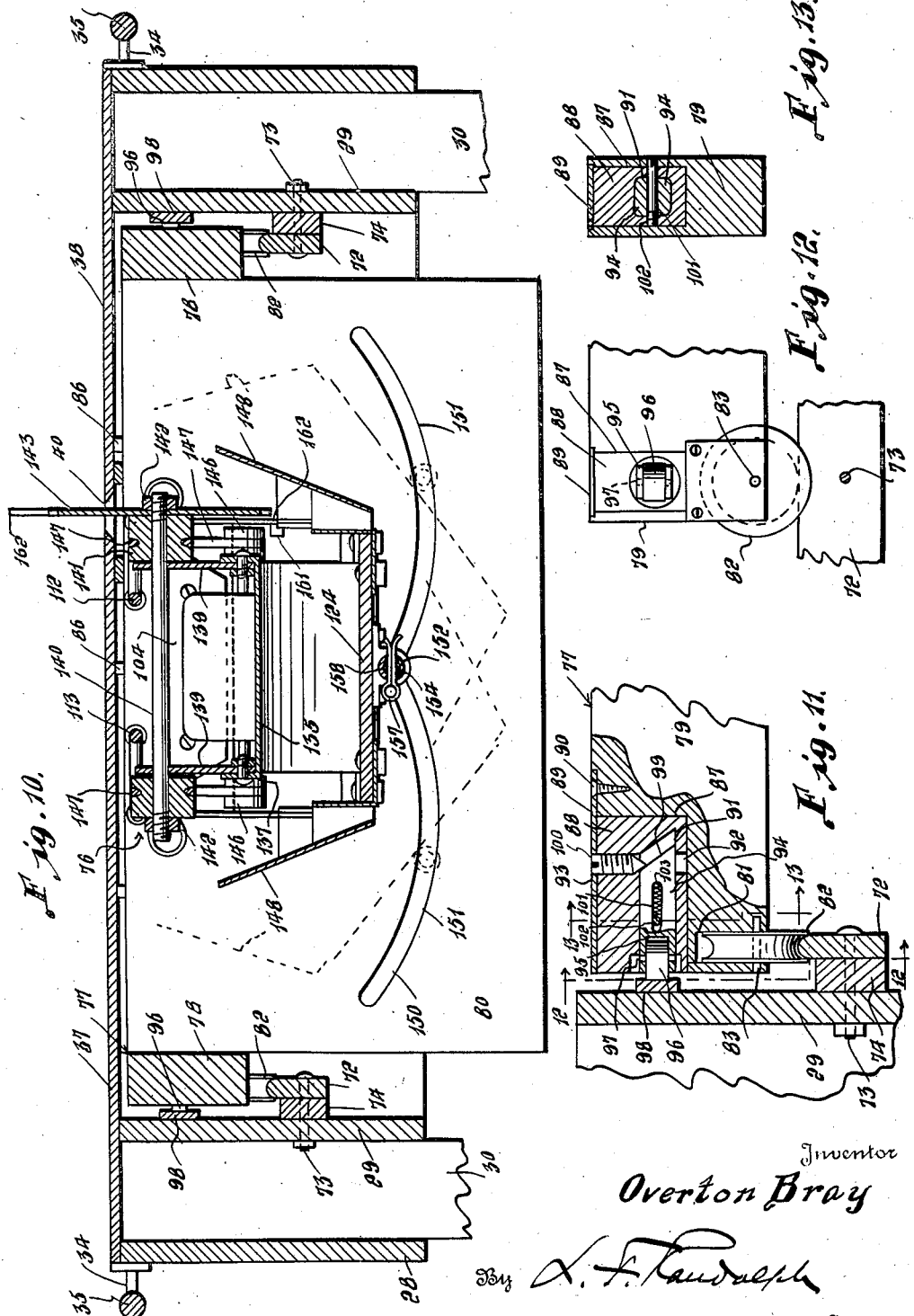

March 9, 1943.　　　　O. BRAY　　　　2,313,617
SAW BENCH
Filed June 26, 1941　　　　6 Sheets-Sheet 6
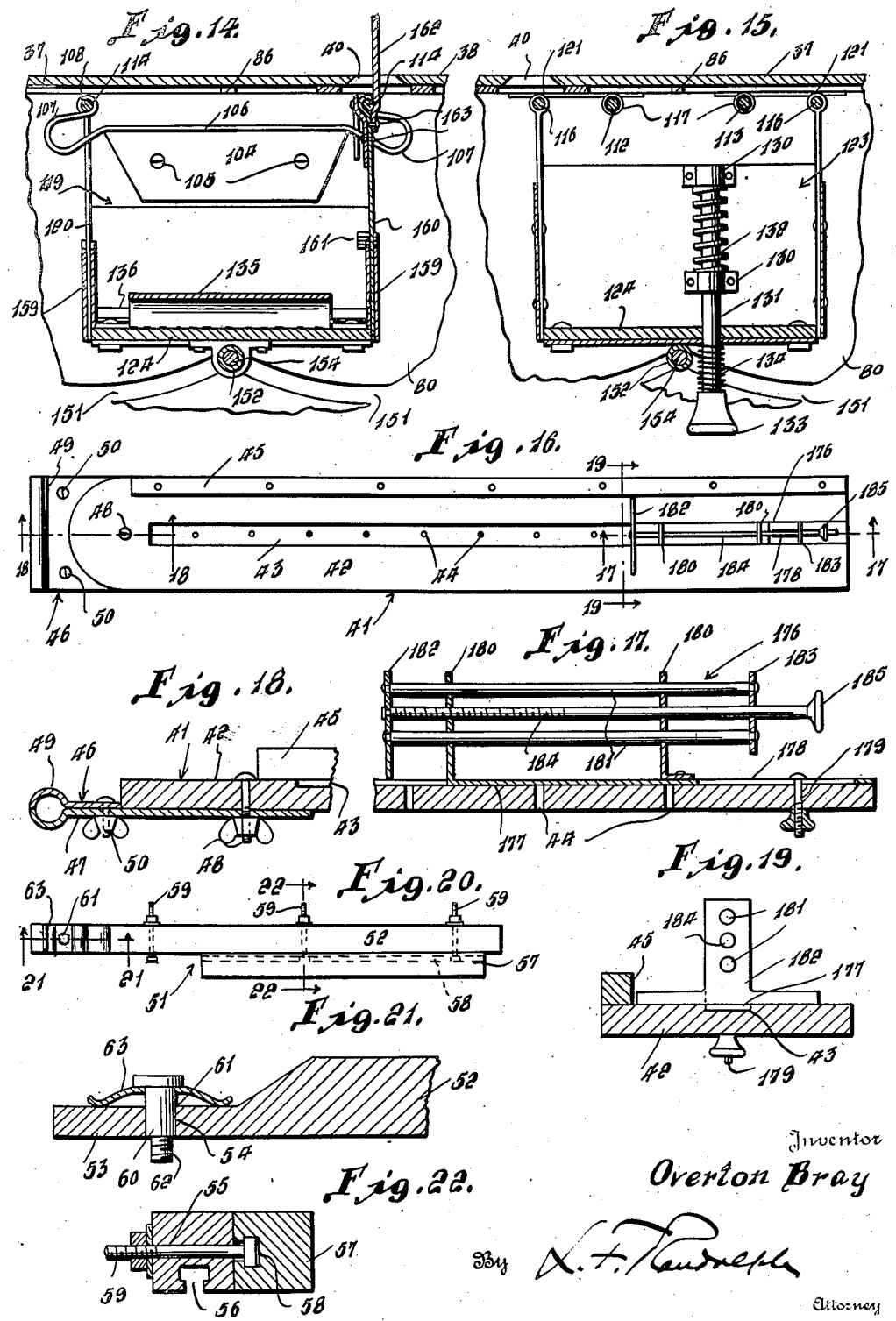
Inventor
Overton Bray
By L. F. Randolph
Attorney Patented Mar. 9, 1943

2,313,617

UNITED STATES PATENT OFFICE 2,313,617

SAW BENCH

Overton Bray, Burley, Idaho, assignor of one-half to O. M. Mitchell, Rupert, Idaho Application June 26, 1941, Serial No. 399,893

6 Claims. (Cl. 143—47)

This invention relates to an improved construction of saw bench having means for supporting the material to be cut in a plurality of positions for cutting the material at any desired angle by means of a circular saw which is movably mounted in the saw bench relatively to the material.

Another aim of the invention is to provide a saw bench containing a movably mounted circular saw capable of being tilted laterally in either direction so that the material can be cut not only at any desired angle but also at the same time, at any desired bevel.

A further aim of the invention is to provide means for raising and lowering the circular saw and for retaining it in any one of a plurality of elevations, while upright or tilted, for cutting mortises or gains of any width and any angle in the material.

Another object of the invention is to provide means for holding a piece of material at any desired angle lengthwise of the saw bench for ripsawing the material, by moving the saw relatively to the material, or for providing guide means to permit the material to be moved relatively to the saw for cutting it lengthwise thereof.

Still another aim of the invention is to provide a saw bench of simple construction, which will be durable and easy to operate and which may be employed for making all types of cuts in lumber or the like with accuracy and uniformity and without the use of gages or other implements or tools.

A further aim of the invention is to provide a saw bench in which the position of the longitudinal slot, through which the circular saw blade is movable, can be adjusted laterally and the saw blade likewise adjusted laterally so that the saw bench is equally well adapted for use by either a right handed or left handed operator, working from the left hand or right hand side, respectively, of the saw bench.

Still another aim of the invention is to provide a saw bench especially adapted for use in cutting rafters of different types, and having means whereby the material may be cut in uniform lengths without having to mark the material.

Other objects and advantages of the invention will hereinafter become more fully apparent from the following description of the drawings, which illustrate a preferred embodiment of the invention, and wherein:

Figure 1 is a top plan view showing the invention assembled with the work supporting members arranged to cooperate with a rip fence member for cutting material lengthwise, Figure 2 is a top plan view of the invention showing the work supporting members arranged to cooperate with an adjustable miter gage for cutting miters or for making other angular cuts in the lumber or material, Figure 3 is a similar view showing the invention with the parts arranged for ordinary cross cutting, Figure 4 is an enlarged longitudinal vertical sectional view taken substantially along the plane of the line 4—4 of Figure 1, Figure 5 is an enlarged top plan view showing the work bench with the top plates thereof removed and with the saw carriage disposed therein, Figure 6 is a longitudinal vertical sectional view of the saw bench taken substantially along a plane indicated by the line 6—6 of Figure 5, Figure 7 is a cross sectional view of the saw bench taken substantially along a plane indicated by the line 7—7 of Figure 6, Figure 8 is an enlarged longitudinal vertical sectional view of the cradle, taken substantially along the plane of the line 8—8 of Figure 5, Figure 9 is a similar view taken substantially along the plane of the line 9—9 of Figure 5, Figure 10 is a fragmentary cross sectional view, on an enlarged scale, of the saw bench taken substantially along a plane indicated by the line 10—10 of Figure 8, Figure 11 is an enlarged transverse vertical sectional view taken substantially along the plane of the line 11—11 of Figure 5, Figures 12 and 13 are vertical sectional views taken substantially along the planes of the lines 12—12 and 13—13, respectively, of Figure 11, Figure 14 and Figure 15 are transverse vertical sectional views taken substantially along the planes of the lines 14—14 and 15—15, respectively, of Figure 8, Figure 16 is an enlarged top plan view of one of the work supporting members with the adjustable stop applied thereto, Figures 17 and 18 are enlarged longitudinal vertical sectional views taken substantially along the planes of the lines 17—17 and 18—18, respectively, of Figure 16, Figure 19 is an enlarged cross sectional view taken substantially along the plane of the line 19—19 of Figure 16, Figure 20 is a top plan view of the miter gage, Figure 21 is an enlarged longitudinal vertical sectional view taken substantially along the plane of the line 21—21 of Figure 20, Figure 22 is an enlarged cross sectional view taken substantially along the plane of the line 22—22 of Figure 20, and Figure 23 is an enlarged cross sectional view taken substantially along the plane of the line 23—23 of Figure 3.

Referring more particularly to the drawings, wherein like reference characters designate like or corresponding parts throughout the different views, 25 designates generally the saw bench in its entirety which, as best seen in Figures 5, 6 and 7, includes a substantially rectangular frame, designated generally 26 having upright end walls 27 and upright outer side walls 28 and inwardly spaced, substantially parallel inner side walls 29. Adjacent the end walls 27, and between the complementary side walls 28 and 29 are provided depending supporting legs 30, by means of which the frame 26 is supported in an elevated position.

As seen in Figure 6, the end walls 27 are provided with strips 31 secured to the inner sides thereof, the upper edges of which are disposed below the level of the upper edges of the end walls 27, and strips 32 which are connected to the outer sides thereof and which are cut-out on their inner sides and under edges to form grooves 33. Brackets 34, as best seen in Figure 5, are attached to and project outwardly from the corners of the frame 26, adjacent the top thereof, and support a railing 35, which extends entirely around the frame 26 and which is spaced outwardly therefrom. The strips 31, as best seen in Figure 5, are provided with upwardly opening pairs of recesses or sockets 36. The pairs of sockets 36 are disposed equal distances from the ends of the strips 31. The saw bench 25 is provided with a top formed by a pair of plates 37 and 38. The plates 37 and 38 are of the same length with the plates 37, as best seen in Figures 1 to 3, substantially wider than the plate 38. The top plates 37 and 38 are provided, adjacent their ends, with pairs of depending studs 39 which are arranged at equal distances from their outer longitudinal edges and which are positioned to fit into the sockets 36 for detachably positioning the plates 37 and 38 relatively to the frame 26. The top plates 37 and 38, when positioned in the frame 26, are disposed so that their adjacent longitudinal edges are spaced from one another to form a longitudinal slot 40. It will be apparent, due to the location of the sockets 36 and the studs 39, that the plates 37 and 38 can be reversed to locate the slot 40 adjacent to either longitudinal edge of the saw bench frame 26. As seen in Figures 1 to 3, the top plates 37 and 38 are provided with longitudinally spaced openings 40' adjacent the slot 40, which openings are internally threaded, for a purpose which will hereinafter be described.

41 designates generally a work supporting member, best illustrated in Figure 16, which includes an elongated substantially flat supporting portion 42 which is provided with a longitudinally extending groove 43 having spaced openings 44 extending downwardly from the bed thereof. Along one longitudinal edge of the portion 42 and to the upper side thereof is secured an abutment strip 45. A clamp, designated generally 46, includes a clamp portion 47 having an elongated shank which is disposed beneath the inner end of the portion 42 and swively connected thereto by means of a bolt and wing nut fastening 48. The shank of the other clamp portion 49 extends only to the rounded inner end of the portion 42 and is connected to the shank of the clamp portion 47 by means of a plurality of bolts and wing nut fastenings 50, as best seen in Figures 16 and 18. The jaws of the clamp portions 47 and 49 are each arcuately shaped and outwardly bowed relatively to one another and are arranged in opposed relationship and sized to be clamped to the rail 35, as illustrated in Figures 1 to 3.

A miter gage, designated generally 51, as best illustrated in Figures 20, 21 and 22, includes an elongated bar 52 having a restricted extension 53 which projects from the bottom portion of one end thereof and which is provided with an opening 54. The bar 52 is provided with a plurality of longitudinally spaced transverse openings 55 which project horizontally therethrough and is also provided in its underside with a longitudinally extending T-shaped slot 56. The miter gage 51 also includes a secondary bar 57, which is shorter than the bar 52 and which is provided with a T-shaped slot 58 in one side thereof which is adapted to slidably engage the square heads of bolts of nut and bolt fastenings 59, which extend through the openings 55, for adjustably connecting the bar 57 to the bar 52. The T-shaped slot 58 extends from end to end of the bar 57 so that the secondary bar 57 can be readily removed, when not required, as will hereinafter become apparent. The opening 54 is adapted to loosely engage the smooth shank portion 60 of a bolt 61 having a restricted threaded lower end 62. The upper part of the shank portion 60 engages an opening intermediate of the ends of a leaf type spring 63 which is turnably mounted on the bolt 61 and the ends of which are curved downwardly to yieldably engage against the upper side of the portion 53 so that the intermediate portion of the leaf spring 63 will frictionally engage against the underside of the head of the bolt 61, as seen in Figure 21. The miter gages 51 may be made in various lengths, as illustrated in Figure 3. As seen in Figure 23, the squared head of a bolt 64 is adapted to slidably engage the T-shaped slot 56 in the underside of the bar 52. The shank of the bolt 64 depends downwardly from the bar 52 and has slidably mounted thereon the sleeve portion of a hook 65. The hook 65 is adjustably supported on the bolt 64 by means of a wing nut 66 which is adjustably connected to the lower, threaded end of the bolt 64.

Referring to Figures 1 and 4, an elongated bar 67 is provided with longitudinally extending perpendicular slots 68 at the ends thereof for receiving the shanks of bolts 69 which have hook shaped lower ends 70 for engaging the under edges of the strips 32 and the grooves 33 thereof. The upper threaded ends of the bolts 69 project above the upper surface of the bar 67 to receive wing nuts 71 for clamping the bar 67 to the top of the saw bench 25 and lengthwise thereof, as illustrated in Figure 1, and for a purpose which will hereinafter be explained.

As seen in Figures 5 and 7, rails 72 are attached to the inner sides of the inner walls 29 by fastenings 73. The rails 72 extend lengthwise of the frame 26 and are spaced inwardly from the walls 29 by spacing blocks 74 through which the fastenings 73 extend and which are spaced from one another to provide slots 75 between the rails 72 and the walls 29.

A saw carriage, designated generally 76, includes a substantially rectangular frame 77 including side rails 78 and end rails 79. The carriage 76 is provided with end walls 80 which are attached to and depend from the inner sides of the end rails 79. As seen in Figure 11, the corners of the frame 77 are recessed, as seen at 81, to receive rollers 82 which are journaled on pins 83 which are mounted in the frame 77. The rollers 82 are disposed lengthwise of the frame 77 and are grooved to engage the rounded upper edges of the rails 72 to provide means whereby the carriage 76 is mounted to move freely in the frame 26 and lengthwise thereof. As seen in Figures 6 and 7, the rails 72 are disposed near the bottom edges of the walls 29 so that the top of the carriage frame 77 is disposed below the level of the upper edges of the walls 28 and 29. As seen in Figures 5 and 9, the upper edges of the end rails 79 are recessed to receive inserts 84 through which extend pins 85 on which are journaled perpendicularly disposed rollers 86 which project above the upper edges of the rails 79 and which are adapted to ride on the undersides of the top plates 37 and 38 to prevent said top plates from sagging and frictionally engaging the carriage 76.

Referring to Figures 11, 12 and 13, the end rails 79 are provided with recesses 87 which open outwardly of their ends and top edges to receive inserts 88 which are provided with separate top plates 89 which are attached to the upper edges of the end rails 79 by fastenings 90. Each of the inserts 88 is provided with a longitudinally extending outwardly opening socket 91 and a perpendicular bore 92 which extends through the socket 91, adjacent its inner end. The plate 89 is provided with a threaded opening 93 which alines with the bore 92, which is also threaded. A plunger 94 is slidably mounted in the socket 91 and is provided with a recessed outer end 95 to receive a roller 96 which is horizontally disposed therein and journaled on a pin 97 which extends perpendicularly through the recessed end 95. The rollers 96 project beyond the sides of the carriage 76 for engaging strips 98 which are attached to the inner sides of the walls 29. Rollers 96 function to prevent the carriage 76 from frictionally engaging the walls 29 and also to prevent the carriage from moving laterally of the frame 26. The inner ends of the plungers 94 are inclined upwardly and outwardly to form cam surfaces 99. A set screw 100 engages each of the bores 92 and its alined opening 93. The set screws 100 are provided with tapered lower ends for engaging the cam faces 99 so that when the set screws 100 are advanced downwardly they will force the plungers 94 outwardly of the sockets 91 to thereby move the rollers 96 outwardly and toward the strips 98. Each of the plungers 94 is provided with a longitudinally extending horizontally disposed slot 101 through which loosely extends a screw 102. As best seen in Figure 13, the screw 102 has one end anchored in the rail 79 and its opposite end anchored in the insert 88 so that the screw 102 detachably retains the insert 88 in position in the recess 87. An expansion coil spring 103 has one end bearing against the screw 102 and its opposite end bearing against the inner end of the slot 101 for urging the plunger 94 inwardly of the socket 91. It will thus be seen that by retracting the set screws 100 the springs 103 will retract the plungers 94 to move the rollers 96 inwardly and out of engagement with the strips 98 so that the carriage 76 can be readily removed from or inserted into the saw bench frame 26.

Referring to Figure 9, a bracket 104 is attached to the inner side of one of the walls 80, adjacent its upper edge, by fastenings 105 and is provided with an inwardly extending flange 106 having projecting upturned ends 107 terminating in barrels or sleeve portions 108 which are spaced inwardly from said end wall 80. The upper edge of the end rail 79, to which said aforementioned end wall 80 is secured, is provided with recessed or countersunk sleeves 109 which are disposed transversely of said rail. The other rail 79 is provided with similar sleeves 110 which aline with the sleeves 109, and said last mentioned rail is also provided with a pair of similar sleeves 111 which are disposed between the sleeves 110 and spaced therefrom and spaced from one another. A pair of rods 112 and 113 are provided with correspondingly outwardly offset ends 114 which slidably engage the sleeves 109. The rods 112 and 113 have portions at their opposite ends bent to form hooks 115 which are turned outwardly. The shanks of the hooks 115 extend through the sleeves 111 and are bent outwardly of one another, therebeyond. The terminal ends of the hooks 115 extend back through the sleeves 110 and therebeyond to form the portions 116. Expansion coil springs are carried by the rods 112 and 113 between the end rails 79. Said springs 117 have corresponding ends bearing against the sleeves 111 and their opposite ends bear against pins 118, which extend through the rods 112 and 113 for urging the rods toward the sleeves 109.

A hanger 119 is provided with angular flanges 120 at its side edges which are provided with sleeves or barrel portions 121 at their upper ends for loosely engaging the rod portions 114, between the sleeves or barrel portions 108 and the end wall 80, adjacent thereto. The hanger 119 is provided at its lower edge with an inturned flange 122. A hanger 123, of the same construction as the hanger 119, is supported by means of its sleeves 121 engaging the terminal ends 116 of the rods 112 and 113, as best seen in Figure 5. A base plate 124 is fastened to the flanges 122 of the hangers 119 and 123.

A pair of laterally alined bearings 125 is mounted above the base plate 124, adjacent the hanger 123 by means of their standards 126 which are fastened to the upper side of the plate 124. A shaft 127 extends through and is journaled in the bearings 125. The shaft 127 is provided with similarly arranged crank ends 128. A worm wheel 129 is keyed to the shaft 127 between the bearings 125.

As seen in Figures 9 and 15 the hanger 123 is provided with alined horizontal bearings 130 for journaling the upper end of a perpendicular shaft 131 which extends downwardly through and is journaled in the plate 124 and the flange 122, of the hanger 123, adjacent its lower end. Between the bearings 130, a worm 132 is keyed to the shaft 131 and is disposed to mesh with the worm wheel 129. The lower end of the shaft 131 is provided with a hand wheel or knob 133 for turning the worm 132 to revolve the worm wheel 129 for raising or lowering the cranks 128. An expansion coil spring 134 is disposed on the shaft 131, between the flange 122, of the hanger 123, and the knob 133 for resisting the turning movement of the shaft 131 so that the shaft will not turn freely but will be retained by friction of the spring 134 in its adjusted positions, for a purpose which will hereinafter become apparent.

A bottom or bottom plate 135 is pivotally connected at one end thereof at 136 to the upper side of the base plate 124, adjacent the hanger 119, and extends to a point intermediate of the ends of the plate 124. The bottom 135 is provided with upturned flanges 137 at the side edges thereof and adjacent its free end, which flanges project substantially beyond the free end of the bottom 135. Flanges 137 are provided with longitudinally extending slots 138 which loosely engage the crank ends of the cranks 128. An upwardly projecting bearing 139 is attached to and projects upwardly from each of the flanges 137, contiguous with the free end of the bottom 135. A shaft 140 is journaled in the bearings 139, adjacent their upper ends, and extends outwardly therebeyond. On the outer sides of the bearings 139, the shaft 140 is provided with pulleys 141, and beyond the pulleys 141 the terminals of the shaft 140 are provided with nuts or other fastening means 142, as best seen in Figure 5, by means of which a circular saw blade 143 can be detachably secured on either end of the shaft 140. A motor 144, preferably an electric motor, has its base resting on and fastened to the bottom 135, adjacent its pivoted end. A driven shaft 145, of the motor 144, extends outwardly from both ends thereof and is disposed transversely of the carriage 76 and is provided at each end with a belt pulley 146, as best seen in Figure 5. The belt pulleys 141 and 146, at corresponding ends of the shafts 140 and 145, are connected by belts 147 for driving the circular saw blade 143. A trough 148, as best seen in Figure 5, is attached at its ends to complementary flanges 120 of the hangers 119 and 123. One trough 148 is thus attached to both side edges of the hangers and said troughs are disposed so that the saw blade 143 extends into the trough which is disposed beneath the end of the shaft 140 on which the blade 143 is mounted. Troughs 148 are open at their bottoms and are provided to receive sawdust from the blade 143 to convey the sawdust downwardly so as to discharge it below the plate 124 so that the parts mounted thereon will not come in contact with the sawdust and will thus be maintained clean and in good operating condition. The saw blade 143 when attached to one end of the shaft 140 is located directly beneath the slot 40, and it will be obvious that the knob 133 can be turned for raising the bottom 135 on its pivot 136 to move a portion of the saw blade upwardly through the slot 40. This is accomplished by the terminal ends of the cranks 128 sliding in the slots 138 and acting as eccentrics for raising and lowering the free end of the bottom 135 which is provided with a notch 149 in its free end to accommodate the worm wheel 129 as the bottom 135 moves relatively thereto. It will be obvious that when the position of the slot 40 is varied laterally of the frame 26, by reversing the location of the top plates 37 and 38, as previously explained, that the saw blade 143 can be applied to the opposite end of the shaft 140, which shaft is of a correct length so that the blade 143 will then be in alinement with the other position of the slot 40.

Furthermore, the alined sleeves 121 of the hangers 119 and 123 are substantially in alinement with the two positions of the saw blade 143, for a purpose which will hereinafter become apparent.

As best seen in Figures 7 and 10, the end walls 80 are each provided with a slot 150 which extends transversely thereof and which is provided with downwardly bowed corresponding end portions 151 whose ends are in substantially the same horizontal plane and whose adjacent ends connect to form continuous slots 150. As seen in Figures 8 and 9, a sleeve 152 is disposed beneath and longitudinally of the plate 124, adjacent its longitudinal center and is attached thereto by means of strap members 153. A rod 154 extends through and beyond the ends of the sleeve 152 and is provided with threaded ends which extend outwardly through the slots 150 and on which are mounted hand wheels 155. The sleeve 152 has opposed longitudinally extending slots 156, intermediate of its ends, through which loosely extend a cotter pin 157 which projects through an opening 158 in the rod 154 to prevent the rod from turning relatively to the sleeve but to permit a limited sliding movement of the rod 154 relatively to the sleeve 152.

As seen in Figure 14, the troughs 148 at the ends thereof which are disposed adjacent to the hanger 119, are provided with upwardly opening sockets 159 for detachably receiving the lower end of a shank 160 which has a laterally projecting stud 161 to limit its downward movement. The shank 160 includes a separate upper section 162 which is detachably connected at its lower end to the upper end of the section 116 by a fastening 163. The adjacent ends of the shank portions 160 and 162 are adapted to loosely engage around the end 114 of either the rod 112 or 113. The shank portions 160 and 162 are mounted adjacent the same side of the carrier 76 as the saw blade 143 and are disposed in alinement therewith so that the shank 162 projects upwardly through the slot 40. A handle 164 is detachably fastened by means of bolt and wing nut fastenings to the upper end of the shank portion 162 to provide means for moving the carriage 76 longitudinally of the saw bench frame 26. The handle 164, as seen in Figure 6, is shaped similarly to the handle of a conventional hand saw and is designed to be engaged by the right hand. As the shank portions 160 and 162 will have to be turned around when applied to the other rod end 114 the handle 164 will have to be removed and reversed to project from the opposite side edge of the shank portion 162 and it is preferred that a separate handle, shaped to fit the left hand be provided when the parts are thus reversed.

The handle 164 is well adapted for use for moving the saw carriage 76 in the saw bench frame 26 when the saw bench 25 is being used for cutting through material, not shown, as the shank portion 162 will move through the cut made by the saw blade 143. However, the saw bench 25 is also well adapted for use in cutting mortises and gains in the underside of material which is resting on the top plates 37 and 38 and when thus used it will be obvious that the handle 164 and its shank portion will have to be removed from the carriage 76. To operate the saw carriage 76 when the saw 143 is being used to cut gains or mortises, a cable or other flexible member 165 is fastened at its ends to eyes 166 which depend from the end rails 79. The cable 165 extends outwardly through openings 167 in the end walls 27 and is then trained over a pair of pulleys 168 which are perpendicularly disposed relatively to one another and supported at one end of the frame 26 by supporting members 169. Pulleys 170 are mounted on the outer side of the other end wall 27, with the lower pulley 170 spaced outwardly from the upper pulley 170 by bracket supports 171. As seen in Figure 6, the cable 165 therefore extends outwardly through the openings 167 and downwardly over the pulleys 168 and 170 so that the intermediate portion of the cable 165 is disposed below the frame 26 and between the legs 30. A shaft 172 is journaled in the bracket means for supporting the lower pulley 170. Said lower pulley 170 is keyed to the shaft 172 which is provided with squared ends 173 for receiving a crank 174 which can be detachably secured to either shaft end 173 by a cotter pin 175.

The purpose and operation of certain of the parts of the saw bench 25 have been described in conjunction with the description of their construction and a further description of these parts, as to their operation, is therefore deemed unnecessary.

It will be obvious that as the shaft 140 and motor 144 are both mounted on the bottom 135 there will be no relative movement of these parts when the bottom 135 is raised and lowered, by turning the knob 133, so that the blade 143 can be driven in the same manner at any elevation within the extremes of its movements upwardly and downwardly. By an outward pull on the hooked end 115 of the rod 112, the portions 114 and 116 of said rod will disengage the sleeves 121, which they normally engage to allow the hangers 119 and 123, and the parts supported thereby to swing to the left, as seen in Figure 10, assuming that the hand wheels 155 have been loosened. The hand wheels 155 can be tightened to hold the parts carried by the hangers at any desired angle to the normal vertical plane of these parts. Similarly, by pulling outwardly on the hooked end 115 of the rod 113 the parts carried by the hangers can be swung to the right, as seen in Figure 10, and similarly clamped at any desired angle. The slots 159 are provided to accommodate the ends of the rod 154 during this swinging movement. As the blade 143 and the shank portions 160 and 162 will always be disposed at the same side of the carriage 76 as the rod 112 or 113 which is not retracted, and which therefore supports the parts carried by the hangers, when said parts are tilted, and as the blade 143 and the shank portions 160 and 162 are in alinement with the ends 114 and 116 of the rod 112 or 113, which is supporting the hangers 119 and 123, while tilted, it will be obvious that the blade 143 and the shank 162 will extend through the slot 49 while in their various tilted positions.

Assuming that a pair of the work supporting members 41 and a pair of the miter gages 51, with the bars 57 attached, are arranged, as seen in Figure 3, it will be apparent that a relatively long piece of lumber, for example, may be supported transversely on the work bench 25 with one edge thereof bearing against the strips 45 and the bars 57, which are alined, and which combine to form abutments for the material to be cut by advancing the saw 143 toward the end of the saw bench frame 26, adjacent to which the members 41 and 51 are attached. The members 51 are attached at their inner ends by the threaded ends 62 being selectively engaged with openings 40', and at their remote ends by the hooks 65 engaging the rail 35, as seen in Figure 23, while the work supporting members 41 are attached to the saw bench frame 26 by their clamps 46, as previously explained. The work supporting members 41 may be of any desired length and may be supported at their free ends by suitable braces or other rests, not shown.

If it is desired to cut the material in exact lengths, this can be accomplished by mounting an adjustable stop designated generally 176 on one of the work supporting members 41. The adjustable stop 176 includes an elongated base strip 177 which fits the groove 43 and which is provided at one end thereof with a longitudinal slot 178 through which loosely extends the bolt of a nut and bolt fastening 179 which selectively engages any one of the openings 44, to thereby provide for a rough adjustment of the stop 176 relatively to the member 41. A finer adjustment is afforded by movement of the portion 177 relatively to the fastening 179 by means of the slot 178, after which the nut of the fastening 179 is tightened to clamp the base portion 177 in adjusted positions. Base portion 177 is provided with upwardly projecting standards 180 through which slidably extend rods 181 which are attached at their ends to upright plates 182 and 183. A feed screw 184 is turnably mounted in the plates 182 and 183 and is threaded to engage a threaded opening in the forward standard 180. By turning the knob 185 on the rear end of the feed screw 184, it will be obvious that the forward plate 182 can be advanced or retracted to provide very exact adjustments of the stop 176, of which the plate 182 forms the abutment to be engaged by the material to be cut. It will thus be seen that the material can be cut in exact lengths without marking and by tilting the saw blade 143, as previously explained, the desired bevel can be obtained, as for example, for cutting rafters of different types to exact uniformity. Also, the elevation of the blade 143 can be varied by adjusting the position of the worm wheel 129, as previously explained, so that the uppermost portion of the blade will not extend as far above the level of the top plates 37 and 38 as the top of the material being cut so that the blade can be used for cutting mortises or gains which may also be cut at angles by tilting the blade 143. When thus used, of course, the handle 164 and the shank portion 162 are removed and the carriage is operated by turning the crank 174.

By dispensing with the miter gages 51 and arranging two of the work supporting members 41 lengthwise of the saw bench 25, as illustrated in Figure 1, the saw bench can be used for ripsawing or cutting material lengthwise with the blade 143. When thus used, the bar 67 is attached lengthwise of the frame 26 by means of its fastenings 69, as clearly illustrated in Figure 4, and adjusted so that the bar 67 can tightly engage one longitudinal edge of the material, not shown, while the other longitudinal edge of the material will be engaged by the strips 45 to securely hold the material against lateral movement while being cut. It will also be obvious that the work supporting members 41 and the bar 67 may be adjusted laterally so that the cut may be made in the material at any point between its side edges. Furthermore, it will be readily apparent that the bar 67 may be set at an angle to the longitudinal axis of the work bench 25, as the fastenings 69 are loosely disposed in the slots 68. Also, the portions 42 of the work supporting members 41 are swivelly connected to the clamps 46, as previously explained, so that they may likewise be adjusted so that their strips 45 will be parallel to the bar 67 when it is thus angularly adjusted. This will enable the material to be cut lengthwise and at an angle or, the saw carriage may be left stationary and the material advanced toward the saw for making a lengthwise cut, employing the bar 67 and the strips 45 as guides for the material while it is being moved.

Also, with the bar 67 removed one miter gage 51 and two of the work supporting members 41 can be arranged, as seen in Figure 2, for angularly cutting material, and by tilting the blade 143 the material can simultaneously be cut at an angle and beveled or a gain or mortise can be cut at any desired angle and slant.

The saw carriage 76 is so constructed that it can be readily removed from the frame 26 and applied to a smaller frame, not shown, in which it can be used as a stationary circular saw while retaining all of its advantages with respect to varying the elevation of the saw blade and the tilting of the saw blade.

Various modifications and changes are contemplated and may be resorted to, provided they fall within the spirit and scope of the invention as hereinafter defined by the appended claims, as only a preferred embodiment of the invention has been disclosed.

I claim as my invention:

1. A saw bench having a top formed of detachable plates, said plates being of different widths, the longitudinal edges of said top plates being spaced to form a longitudinal slot in the top of the saw bench, means for detachably mounting said plates so that the plates are reversible for arranging said longitudinal slot adjacent either longitudinal edge of the saw bench, a cradle slidably mounted in the saw bench, lengthwise thereof, and beneath said plates, said cradle including a bottom pivotally mounted at one end thereof, a circular saw supported by said bottom and disposed thereabove, a motor mounted on said bottom and connected to the circular saw, manually operated means for swinging the free end of said bottom upwardly and downwardly for raising and lowering the saw, said saw being disposed for movement through the longitudinal slot of the saw bench, means for laterally adjusting the saw relatively to the cradle for positioning the saw in alinement with said slot in either position in which the top plates are disposed.

2. A saw bench as in claim 1, said saw bench including a rectangular frame having side walls, tracks projecting inwardly from said side walls and extending longitudinally thereof for slidably supporting the cradle, rollers projecting from the sides of said cradle for engaging the sides of said frame, and means for adjustably positioning said rollers to prevent lateral movement of the cradle relatively to the saw bench.

3. A saw bench as in claim 1, said cradle being provided with upwardly projecting rollers for engaging the underside of said top plates to prevent the top plates from sagging and frictionally engaging the cradle.

4. A saw bench cradle adapted to slidably engage a saw bench, said cradle including end walls, rods slidably mounted in said end walls, a frame having upstanding corner posts, said corner posts having sleeves at their upper ends for loosely engaging portions of said rods, a plate pivotally connected to one end of said frame, a circular saw supported by said plate and mounted thereabove, a motor supported by the plate for driving the saw, means for raising and lowering the free end of said plate for raising and lowering said saw relatively to the cradle, said rods being selectively movable for releasing either side of the frame to permit the frame to swing transversely of the cradle for tilting the saw transversely of the cradle, and means carried by the frame for engaging said ends walls for holding the frame in various tilted positions.

5. A structure as in claim 4, said means for raising and lowering said plate including a worm wheel journaled above the bottom of the frame, a worm journaled on an end wall of the frame and in mesh with the worm wheel, said plate being provided with a slotted extension at its free end, and said worm wheel having an eccentrically disposed pin for engaging said slot for raising and lowering said plate when the worm wheel is turned.

6. A structure as in claim 4, comprising bearings mounted on said plate adjacent its free end, a shaft journaled in said bearings, said shaft being disposed transversely of the cradle, means for detachably connecting the circular saw to either end of the shaft for positioning it on the outer side of either side of the frame, and said frame being provided with troughs at the sides thereof for receiving sawdust from the circular saw and for conveying the sawdust away from the parts mounted on the cradle.

OVERTON BRAY.